United States Patent [19]
Heinmets

[11] 3,877,306
[45] Apr. 15, 1975

[54] FUSIBLE PLUG TEMPERATURE INDICATING DEVICE
[75] Inventor: Ferdinand Heinmets, Wellesley Hills, Mass.
[73] Assignee: Sarah A. Kurzon, Cambridge, Mass.; a part interest
[22] Filed: Jan. 18, 1974
[21] Appl. No.: 434,510

[52] U.S. Cl. .............................. 73/358; 116/114.5
[51] Int. Cl. ........................................ G01k 11/06
[58] Field of Search ....... 73/358; 116/114.5, 114 V, 116/106

[56] References Cited
UNITED STATES PATENTS
| | | | |
|---|---|---|---|
| 2,379,459 | 7/1945 | Schreiber et al. | 73/358 |
| 2,677,278 | 5/1954 | Smith et al. | 73/358 X |
| 3,036,894 | 5/1962 | Forestiere | 73/358 X |
| 3,521,489 | 7/1970 | Finkelstein et al. | 73/358 |
| 3,688,582 | 9/1972 | Gradishar | 73/358 |

Primary Examiner—Richard C. Queisser
Assistant Examiner—Daniel M. Yasich

[57] ABSTRACT

A single-use, disposable thermometer has a primary and several secondary chambers and passages therebetween, the chambers having equal pressures therein, a fusible plug lodged in and sealing each passage, the plugs being made of material that melts at a sequence of threshold temperatures, a control element responsive to rupturing by a user of the device to admit atmospheric pressure into the primary chamber, the wall of the passages being transparent and positioned to display shifts of position of the plugs along the passages. An alternative embodiment has a primary chamber closed and at atmospheric pressure with a portion of flexible wall for changing the pressure in the primary chamber by flexing, and a mechanism for maintaining this portion of wall in its flexed condition.

6 Claims, 6 Drawing Figures

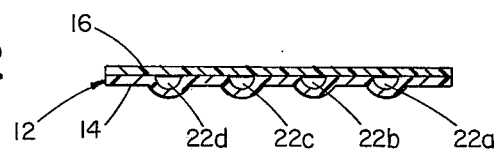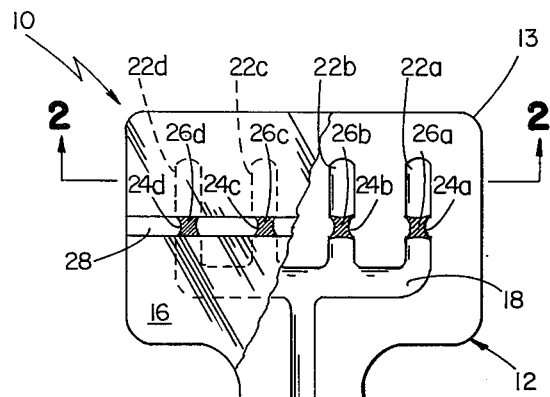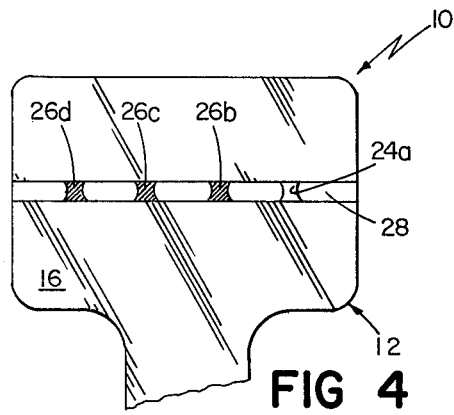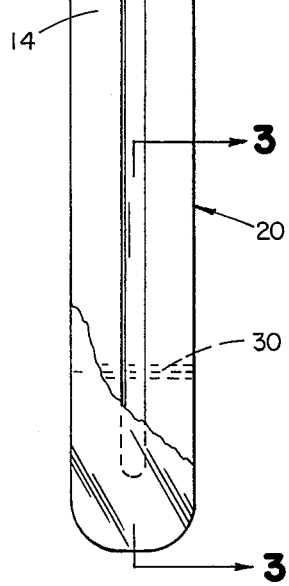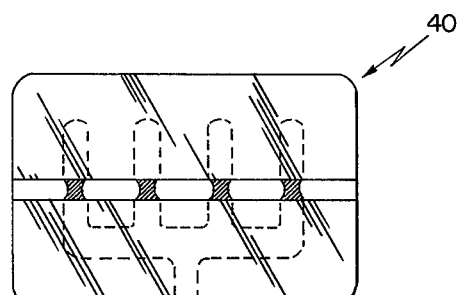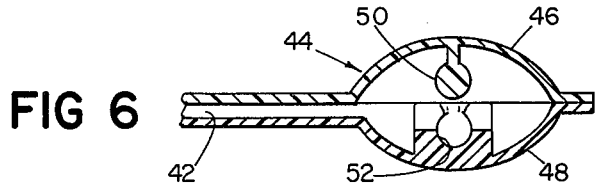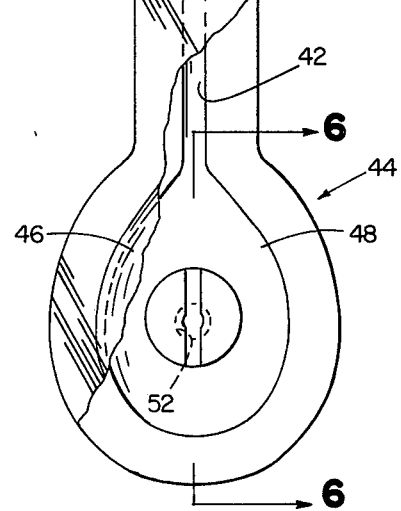

FUSIBLE PLUG TEMPERATURE INDICATING DEVICE

BACKGROUND OF THE INVENTION

This invention relates to thermometers and more particularly to thermometers which are used once and discarded.

Single use thermometers employing fusible elements which indicate exposure of the thermometer to temperatures above the melting point of the fusible material have generally had to be maintained at all times subsequent to their manufacture and prior to use at temperatures below the melting point of the fusible materials used in their construction. They have also, in many cases, been too expensive, especially in view of their having a capacity to be used only once.

SUMMARY OF THE INVENTION

The invention features a structure defining a primary and a secondary chamber and a passage therebetween, the chambers having equal pressures therein, a fusible plug lodged in and sealing the passage, the plug being made of material that melts at the threshhold temperature, a control element operatively connected to and controlling the pressure in the first chamber, the element being responsive to an activating act by a user of the device to change the pressure in the primary chamber, a zone of a wall of the passage being transparent and positioned to display a shift of position of the plug along the passage, the device being prior to activation unresponsive to exposure to temperature above the threshhold temperature, and after activation responsive to any such exposure, providing a permanent indication thereof by a visible shift of the plug.

A preferred embodiment of the invention features an additional secondary chamber, fusible plug, and passage with a transparent zone, the device adapted for use as a medical fever thermometer having a broad portion wherein the secondary chambers and plugs are grouped and an elongated portion providing a handle, and a pressure different from atmospheric in the primary chamber which has a rupturable portion for admitting atmospheric pressure. An alternative embodiment of the invention features a primary chamber closed and at atmospheric pressure and a portion of flexible wall for changing the pressure in the primary chamber by flexing and a mechanism for maintaining this portion of wall in its flexed condition.

Additional features and advantages will be seen from the following description of preferred embodiments.

BRIEF DESCRIPTION OF THE DRAWING

FIG. 1 shows a device according to the invention adapted for use as a medical fever thermometer;

FIG. 2 shows a cross-sectional view of the device of FIG. 1 along the section 2—2;

FIG. 3 shows a cross-sectional view of a portion of the device of FIG. 1 along the section 3—3;

FIG. 4 shows a portion of the device of FIG. 1 showing the appearance of the device after use;

FIG. 5 shows an alternative version of a fever thermometer; and

FIG. 6 shows a cross-section of the device of FIG. 5 along the section 6—6.

DESCRIPTION OF A PREFERRED EMBODIMENT

Disposable medical thermometer 10, made according to the invention, has a structure 12 of a generally spade-like shape with broad portion 13 and elongated handle portion 20 facilitating manipulation of the device. Structure 12 is made up of embossed plate 14 and flat plate 16 adhering thereto. Structure 12 defines primary chamber 18 extending into handle 20 and a plurality of secondary chambers 22a, 22b, 22c etc. grouped in broad portion 13 and communicating with primary chamber 18 respectively through passages 24a, 24b, 24c etc., the passages being somewhat constricted as compared to the secondary chambers. A fusable plug 26a made of material melting at a first threshold temperature, say $T_a$, is lodged in passage 24a sealing off the communication between primary chamber 18 and secondary chamber 22a. A similar plug 26b, made of material with melting point $T_b$ somewhat higher than that of plug 26a, is lodged in passage 24b, and so on through the remaining passages, each successive plug having a somewhat higher melting point.

Plug materials may be compounded by mixing together various amounts of Capric and Lauric acids to obtain desired melting points. The following table shows mixtures suitable for use in a medical thermometer, but alternative ratios of constituents can readily be formulated to obtain alternative melting points:

| wt % Capric acid | wt % Lauric acid | Melting point (°C) |
|---|---|---|
| 27.5 | 72.5 | 36 |
| 25.0 | 75.0 | 37 |
| 22.5 | 77.5 | 38 |
| 19.0 | 81.0 | 39 |

Plate 16 is generally opaque but has a transparent window 28 extending across the broad portion 13 of the device 10 and permitting observation of the plugs in the passages. Handle 20 has a notch 30, generally towards its lower end, to provide a convenient place for rupturing the wall of structure 12. Chambers 18 and 22a, 22b, 22c etc. are partially evacuated and all have equal pressures therein somewhat less than the ambient atmospheric pressure.

In operation, the user of device 10 activates the device by breaking off the lower end of the handle 20 at notch 30, thereby admitting air of atmospheric pressure into chamber 18 and then places the broad portion 13 of the device under the tongue of a patient whose temperature is to be measured. If, in the patient's mouth, the broad portion 13 is exposed to a temperature in excess of $T_a$, plug 26a will melt, and the now molten plug will be shifted by the differential pressure between primary chamber 18 and secondary chamber 22a through passage 24a towards chamber 22a. On subsequent examination, the window 28 will display the movement of the plug which took place upon its melting. If the temperature to which the broad portion 13 was exposed in the patient's mouth exceeded the temperature $T_b$, similar action would take place with plug 26b and so on through the additional passages and plugs provided in the device. The appearance of the device after exposure to a temperature above $T_a$, but less than $T_b$, is shown in FIG. 4, where it can be seen that the right-most plug has been shifted out of sight in window 28 but the three left-most plugs are still in place.

The condition of the device as shown in FIG. 4 accordingly indicates the patient's temperature to be above $T_a$ but below $T_b$.

Device 40 shown in FIGS. 5 and 6 has an alternative activating element. Primary chamber 42 extends into a bulb structure 44 with flexible walls 46. In device 40 the pressure in all chambers is atmospheric prior to activation. Device 40 is actuated by squeezing walls 46 and 48 together, driving locking ball 50 into slot 52 and increasing the pressure in chamber 42. Engagement of ball 50 with slot 52 prevents the flexible walls from returning to their original positions so the pressure remains above atmospheric in chamber 42. The device 40 is then placed in the mouth of a patient and operates as described above in connection with device 10.

The thermometer according to my invention as described above is inexpensive to manufacture and may be stored without concern as to exposure to temperatures above the melting points of its fusible plugs since prior to activation there is no differential pressure across the plugs so that even if melted the plug will not shift from its established position.

Those skilled in the art will recognize that my invention may be adapted to other uses where a temperature measurement is required, employing appropriate alternative melting materials and structural shapes, such adaptations being within the scope of the following claims.

I claim:

1. A thermometric device indicating exposure to temperature in a preselected range above a threshold temperature comprising
   a structure defining a primary and a secondary chamber and a passage therebetween, said chambers having equal pressures therein,
   a fusible plug lodged in and sealing said passage, said plug being made of material that melts at said threshhold temperature,
   a control element operatively connected to and controlling the pressure in said first chamber, said element being responsive to an activating act by a user of said device to change the pressure in said primary chamber,
   a zone in a wall of said passage being transparent and positioned to display a shift of position of said plug along said passage;
   said device being prior to activation unresponsive to exposure to temperature in said preselected range above said threshold temperature, and after activation responsive to any such exposure, a differential pressure derived from said activating act aiding in providing a permanent indication thereof by a visible shift of said plug along said passage.

2. A device as claimed in claim 1, said structure defining a second secondary chamber and a second passage between said second secondary chamber and said primary chamber, said second secondary chamber having a pressure therein equal to that in the primary chamber, a second fusible plug being lodged in and sealing said second passage, said second plug being made of a material melting at a second threshhold temperature higher than said first threshold temperature, a zone in a wall of said second secondary passage being transparent and positioned to display a shift of said second plug along said second passage, said device after activation providing a permanent indication of exposure to temperature between said first and second threshhold temperatures and a different indication of exposure to temperature above said second threshold temperature.

3. A device as claimed in claim 2 for use as a medical fever thermometer, said structure having a flat, generally spade-like shape with a broad portion and an elongated portion, said secondary chambers and their associated passages being grouped in the broad portion and said elongated portion providing a handle to facilitate manipulation of the device.

4. A device as claimed in claim 1, said primary chamber having a pressure therein different from atmospheric and said control element including a portion rupturable by an activating act to admit atmospheric pressure to said primary chamber thereby changing the pressures in said primary chamber relative to said secondary chamber.

5. A device as claimed in claim 1, said primary chamber being closed and having a portion of its wall flexible, the pressure in said primary chamber being changed when said flexible portion of wall is deformed and maintained in its deformed state.

6. A device as claimed in claim 5, including a locking mechanism attached to said flexible portion of wall to maintain said flexible portion of wall in its deformed state after it has been once deformed.

* * * * *